(12) United States Patent
Izumi

(10) Patent No.: US 7,661,403 B2
(45) Date of Patent: Feb. 16, 2010

(54) START CONTROLLER FOR INTERNAL COMBUSTION ENGINE

(75) Inventor: Kazunari Izumi, Obu (JP)

(73) Assignee: Denso Corporation, Kariya (JP)

( * ) Notice: Subject to any disclaimer, the term of this patent is extended or adjusted under 35 U.S.C. 154(b) by 305 days.

(21) Appl. No.: 11/822,486

(22) Filed: Jul. 6, 2007

(65) Prior Publication Data
US 2007/0251481 A1 Nov. 1, 2007

Related U.S. Application Data

(62) Division of application No. 11/273,326, filed on Nov. 15, 2005, now Pat. No. 7,287,500.

(51) Int. Cl.
*F02N 17/00* (2006.01)
(52) U.S. Cl. .................................. 123/179.16
(58) Field of Classification Search .............. 123/179.4, 123/179.16, 182.1
See application file for complete search history.

(56) References Cited

U.S. PATENT DOCUMENTS

| | | | |
|---|---|---|---|
| 4,206,728 | A | 6/1980 | Trenne |
| 5,909,720 | A | 6/1999 | Yamaoka et al. |
| 6,026,921 | A * | 2/2000 | Aoyama et al. ............. 123/348 |
| 6,397,803 | B1 | 6/2002 | Fujiwara et al. |
| 6,705,257 | B2 | 3/2004 | Shimizu |
| 7,107,951 | B2 | 9/2006 | Urushihata et al. |
| 7,188,605 | B2 | 3/2007 | Wild et al. |
| 7,363,896 | B2 | 4/2008 | Urushihata et al. |
| 2001/0022166 | A1 | 9/2001 | Yamaguchi et al. |
| 2003/0106515 | A1 | 6/2003 | Kondon |
| 2004/0221834 | A1 | 11/2004 | Miyamoto et al. |
| 2006/0096565 | A1 | 5/2006 | Hattori et al. |
| 2007/0056546 | A1 | 3/2007 | Trask et al. |

FOREIGN PATENT DOCUMENTS

| | | |
|---|---|---|
| JP | A-H10-252515 | 9/1998 |
| JP | 2000-34913 | 2/2000 |

(Continued)

OTHER PUBLICATIONS

Japanese Office Action dated May 27, 2009, issued in corresponding Japanese Application No. 2004-331115, with English translation.

(Continued)

*Primary Examiner*—Stephen K Cronin
*Assistant Examiner*—Arnold Castro
(74) *Attorney, Agent, or Firm*—Nixon & Vanderhye PC

(57) ABSTRACT

At an intake timing of an initial combustion cylinder, an actual intake valve timing is adjusted to a target intake valve timing corresponding to a target intake air flow rate of the initial combustion cylinder. At intake timing of the other cylinders which contributes to increment of the engine speed after the initial combustion, the actual intake valve timing is adjusted to a target valve timing corresponding to a target intake air flow rate of the other cylinders. Thereby, the intake air flow rate of each cylinder is accurately controlled, so that the increment of the engine speed is restricted within a range in which a startability is not deteriorated and a vehicle vibration and an over shoot of the engine speed is appropriately restricted.

10 Claims, 9 Drawing Sheets

FOREIGN PATENT DOCUMENTS

| | | |
|---|---|---|
| JP | 2000-204987 | 7/2000 |
| JP | A-2000-328988 | 11/2000 |
| JP | A-2001-20787 | 1/2001 |
| JP | 2002-061522 | 2/2002 |
| JP | 2002-188472 | 7/2002 |
| JP | 2002-213261 | 7/2002 |
| JP | 2002-303231 | 10/2002 |
| JP | 2004-169576 | 6/2004 |
| JP | 2004-316561 | 11/2004 |

OTHER PUBLICATIONS

Japanese Office Action dated Jul. 14, 2009, issued in corresponding Japanese Application No. 2004-367193, with English translation.

Japanese Office Action dated Oct. 15, 2008, issued in counterpart Japanese Application No. 2004-33115, with English translation.

Japanese Office Action dated Dec. 1, 2008, issued in counterpart Japanese Application No. 2004-367193, with English translation.

\* cited by examiner

START CONTROLLER FOR INTERNAL COMBUSTION ENGINE

CROSS REFERENCE TO RELATED APPLICATIONS

This application is a divisional of U.S. patent application Ser. No. 11/273,326 filed Nov. 15, 2005 now U.S. Pat. No. 7,287,500 and which claimed priority from Japanese Patent Applications No. 2004-331115 filed on Nov. 15, 2004 and No. 2004-367193 filed on Dec. 20, 2004, the disclosure of which priority applications is incorporated herein by reference.

FIELD OF THE INVENTION

The present invention relates to a start controller for an internal combustion engine that is provided with a variable valve controller. The variable valve controller varies opening/closing characteristics of an intake valve.

BACKGROUND OF THE INVENTION

The variable valve controller adjusts a valve timing or valve lift of an intake valve in order to improve output of the engine, to enhance fuel economy, and to reduce emission.

JP-2002-213261A shows a start controller utilizing the variable valve controller in which the intake valve timing or intake valve lift is adjusted in such a manner that an intake air flow rate at starting of the engine becomes minimum quantity to ignite air-fuel mixture in a cylinder, so that a cranking vibration is reduced.

JP-2002-188472A shows a start controller in which the intake valve lift is made small until the engine speed reaches a predetermined peak speed. After the engine speed reaches the peak speed, the intake valve lift is made small to increase the intake air flow rate, so that an over shoot of the engine speed is reduced.

Recently, in order to improve startability of the engine, such as reduction of engine vibration, it is necessary to precisely control the engine speed at starting in which engine speed varies every combustion.

Besides, it is necessary to control the intake air flow rate at intake timing in order to control the variation of engine speed by the intake air flow rate. However, the conventional start controller for an engine conducts the intake valve control irrespective of the intake valve timing. Thus, it is hard to precisely control the engine speed of the engine by controlling the intake air flow rate.

JP-10-82332A (U.S. Pat. No. 5,909,720) shows that, in a hybrid vehicle, the intake valve timing is retarded to reduce an effective compression ratio, and then a starter motor conducts cranking of the engine to reduce the vibration at the cranking. After the engine speed reaches a predetermined value, the intake valve timing is advanced to increase the effective compression ratio and then a fuel injection and an ignition of the air-fuel gas are started to generate an initial combustion.

However, such a system is hardly applied to a vehicle which is driven by only the internal combustion engine.

SUMMARY OF THE INVENTION

The present invention is made in view of the foregoing matter and it is an object of the present invention to provide a start controller capable of precisely controlling the engine speed at starting to enhance the startability.

According to the present invention, the start controller for an internal combustion engine, including a variable intake valve controller which adjusts the intake valve characteristic, includes a start control means for adjusting an intake air flow rate of an initial combustion cylinder by controlling the variable intake valve controller considering the timing of an air intake event in the initial combustion cylinder.

The start controller includes a start control means for starting a cranking of the engine by means of a starter in a situation that an actual compression ratio is decreased by a variable intake valve controller, the start control means for starting combustion of the engine at a time when an engine speed is increased to restrict a vehicle vibration due to an initial combustion under a predetermined level, and the start control means for increasing the actual compression ratio by means of the variable intake valve controller at a time when or before the combustion is started.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Embodiments of the present invention will be described hereinafter with reference to the drawings.

First Embodiment

Figure 1:
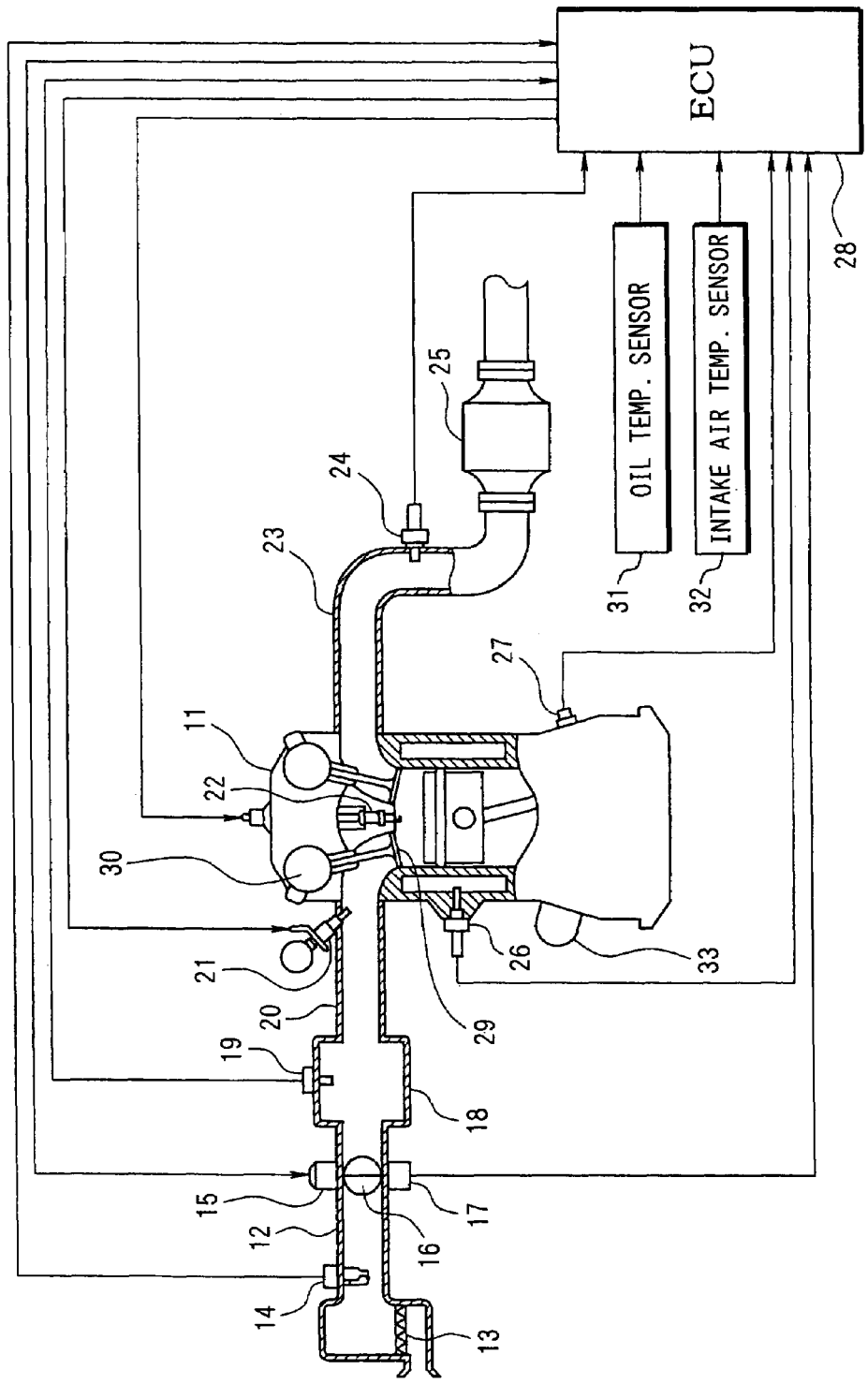
FIG. 1 is a schematic view of an engine control system according to a first embodiment of the present invention.

Referring to FIGS. 1 to 4, a first embodiment is described. FIG. 1 is a schematic view of an engine control system. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position are provided downstream of the air flow meter 14.

A surge tank 18 including an intake air pressure sensor 19 is provided down stream of the throttle valve 16. The intake air pressure sensor 19 detects intake air pressure. An intake manifold 20 is connected to the surge tank 18. A fuel injector 21 is mounted on the intake manifold 20 at a vicinity of an intake air port. A spark plug 22 is mounted on a cylinder head of the engine 11 corresponding to each cylinder to ignite air-fuel mixture in each cylinder. The spark plug generate spark to ignite a fuel-air mixture in the cylinder.

A valve timing controller 30 is connected to the intake air valve 29 of the engine 11. The valve timing controller 30 varies the camshaft phase in order to adjust the valve timing of the intake air valve 29.

An exhaust pipe 23 of the engine 11 is provided with a three-way catalyst 25 purifying CO, HC, and NOx in the exhaust gas. An exhaust gas sensor 24 (an air-fuel ratio sensor, an oxygen sensor) disposed upstream of the three-way catalyst 25 detects air-fuel ratio or rich/lean of the exhaust gas.

A coolant temperature sensor 26 detecting a coolant temperature and a crank angle senor 27 outputting a pulse signal every predetermined crank angle of a crankshaft of the engine 11 are disposed on a cylinder block of the engine 11. The crank angle and an engine speed are detected based on the output signal of the crank angle sensor 27. An oil temperature sensor 31 detects temperature of engine oil, and an intake air temperature sensor 32 detects temperature of intake air.

The engine 11 is provided with a starter 33 for cranking the engine 11 at the time of starting of engine. The starter 33 includes reduction gears (pinion gear and ring gear) that have a predetermined gear ratio.

The outputs from the above sensors are inputted into an electronic control unit 28, which is referred to an ECU hereinafter. The ECU 28 includes a microcomputer which executes an engine control program stored in a ROM (Read Only Memory) to control a fuel injection amount of a fuel injector 21 based on an engine running condition and an ignition timing of the spark plug 22.

The ECU 28 executes an engine automatic stop/start program, whereby the engine is automatically stopped when a predetermined condition is established, and the engine is automatically started when a predetermined condition is established.

Figure 2:
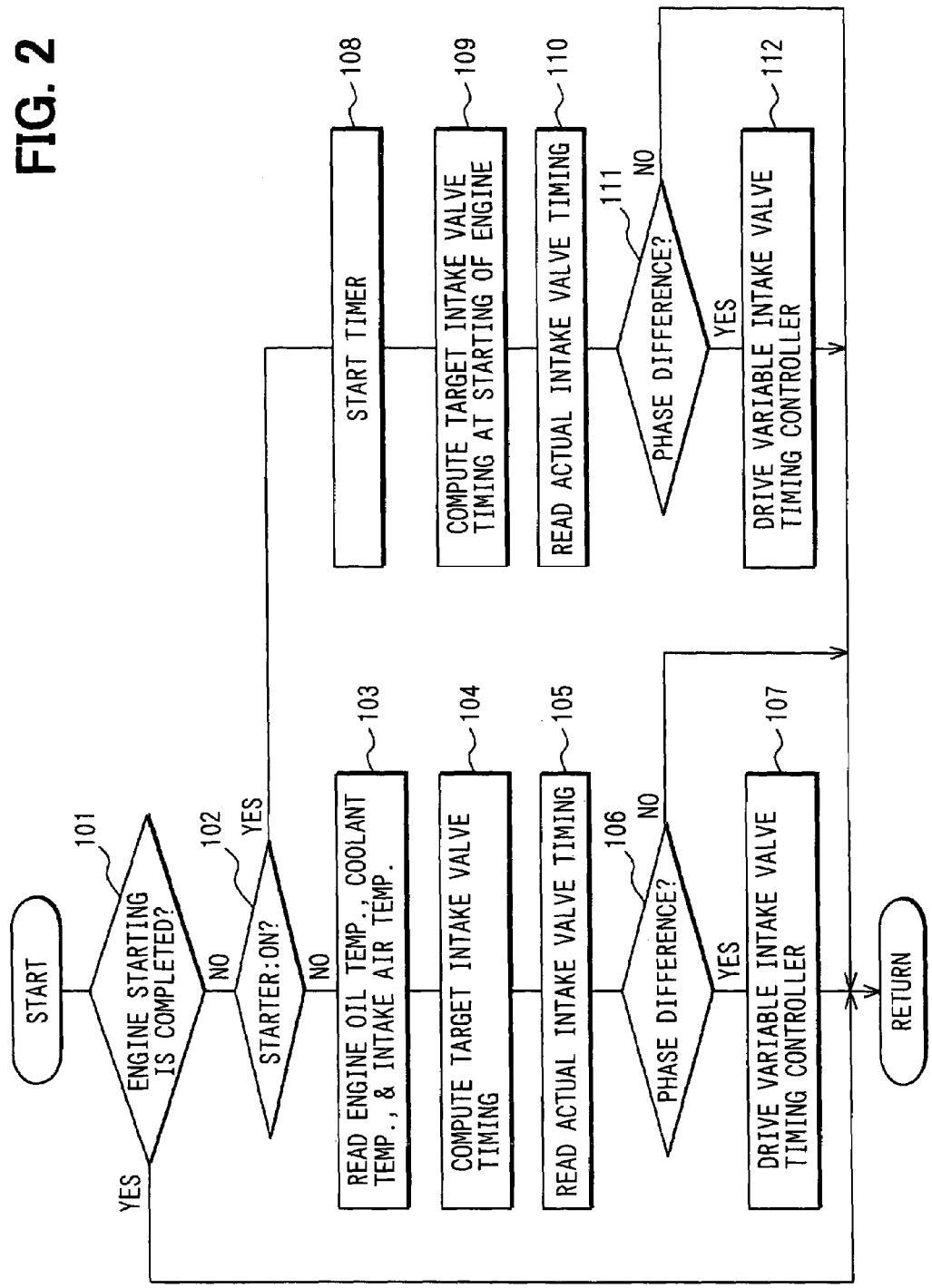
FIG. 2 is a flowchart showing a variable intake valve control process at starting of engine according to the first embodiment.

The ECU 28 executes a variable intake valve control program shown in FIG. 2 so that a target intake valve timing is established according to an estimated engine speed pattern at the time of starting engine. The variable valve timing controller 30 adjusts the actual valve timing into the target intake valve timing.

At an intake timing of an initial combustion cylinder, the actual valve timing is adjusted into the target intake valve timing corresponding to a target intake air flow rate of the initial combustion cylinder. Thereby, the intake air flow rate of the initial combustion cylinder is accurately adjusted so that the engine speed increment due to the combustion in the initial combustion cylinder is well controlled. At intake timings of the other cylinders, the actual valve timing is adjusted into the target intake valve timing, so that the engine speed increment after the initial combustion is well controlled.

Figure 3:
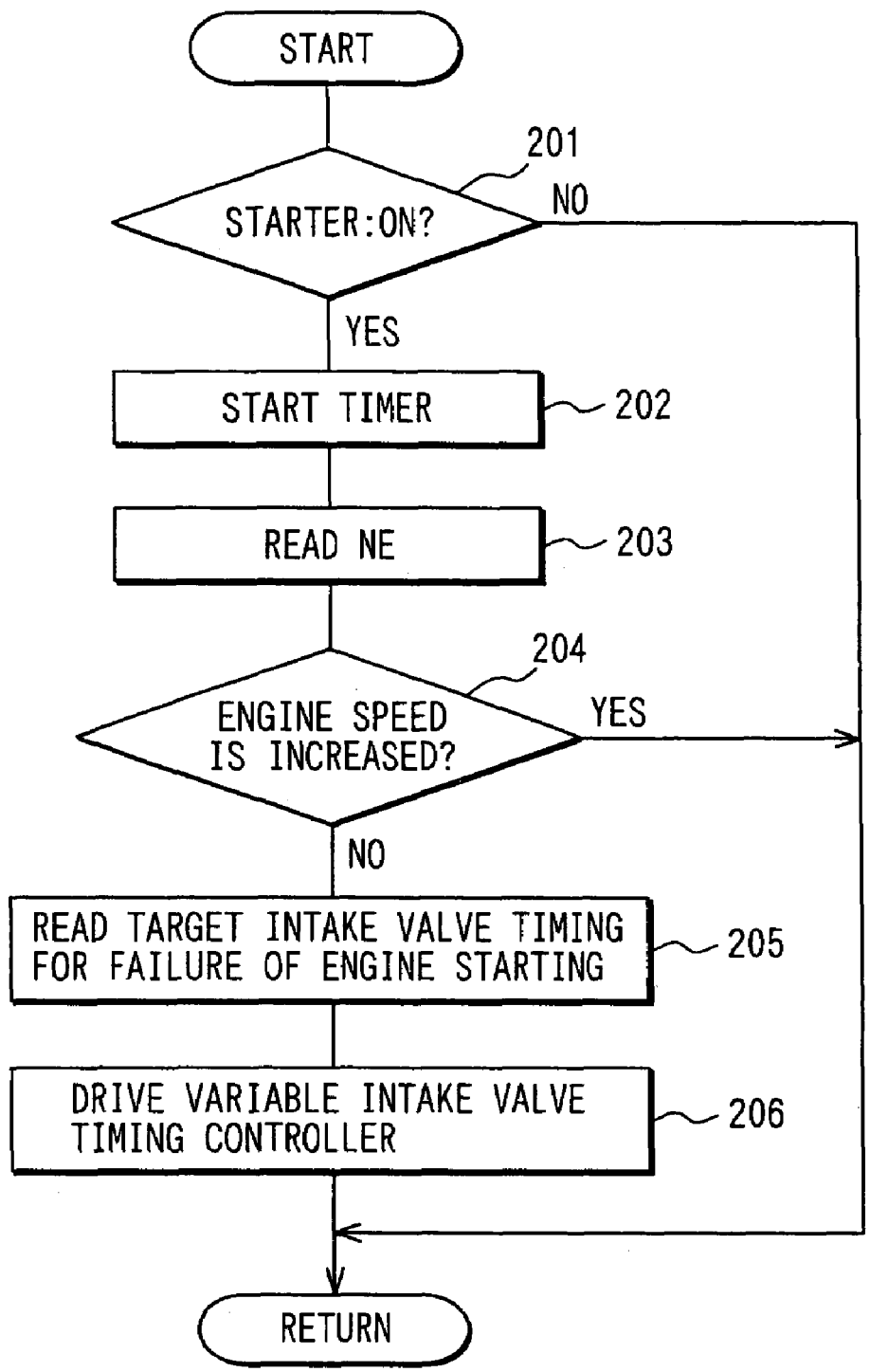
FIG. 3 is a flowchart showing a variable intake valve control process for failure of starting engine according to the first embodiment.

The ECU 28 executes a variable intake valve control program for failure of starting engine shown in FIG. 3. When a failure of starting engine is occurred at the time of starting engine, the target intake valve timing is established for eliminating the failure of starting engine. The variable intake valve timing 30 adjusts the actual valve timing into the target intake valve timing. The variable intake valve control program shown in FIG. 2 and the variable intake valve control program for failure of starting engine shown in FIG. 3 correspond to an engine start control means.

The processes executed in the programs shown in FIGS. 2 and 3 are described hereinafter.

(The Variable Intake Valve Control at the Time of Starting Engine)

The control program shown in FIG. 2 is executed every predetermined period while the ECU 28 is energized. In step 101, the computer determines whether the engine starting is completed according to whether the engine speed exceeds a predetermined speed. When the answer is No in step 101, the procedure proceeds to step 102 in which a determination is made as to whether the starter (not shown) is turned on.

When the answer is No in step 103, the procedure proceeds to step 103 in which a current engine condition, such as engine oil temperature, engine coolant temperature, and intake air temperature, is read. Then, the procedure proceeds to step 104 in which the target intake valve timing is computed based on a map according to the current engine condition. The target intake valve timing is established at the most retarded position or a position that is a little advanced than the most retarded position.

In step 105, the current actual intake valve timing is read. In step 106, a determination is made as to whether the actual intake valve timing is consistent with the target intake valve timing according to whether a phase difference exists therebetween. When both timing is not consistent with each other, the procedure proceeds to step 107 in which the variable valve timing controller 30 is operated in order to make the actual intake valve timing consistent with the target intake valve timing. Thereby, the actual intake valve timing is made consistent with the target intake valve timing before starting the cranking of the engine.

When the answer is Yes in step 102, the procedure proceeds to step 108 in which a timer is started to measure the elapsed time period since the starter is turned on. Then, the procedure proceeds to step 109 in which the target intake valve timing is computed based on the map according to the elapsed time period.

Generally, the intake timings of the initial combustion cylinder and the other cylinder vary based on the behavior of the engine speed at the time of starting engine. The map of the target intake valve timing is established based on an intake timing of each cylinder, which is adapted to an estimated behavior pattern of the engine speed at time of starting engine. The estimated behavior pattern of the engine speed is derived based on experimental data and designing data. By computing the target intake valve timing based on the elapsed time since the starter is turned on, the target intake valve timing corresponding to the intake air flow rate at the intake timing is computed.

Figure 4:
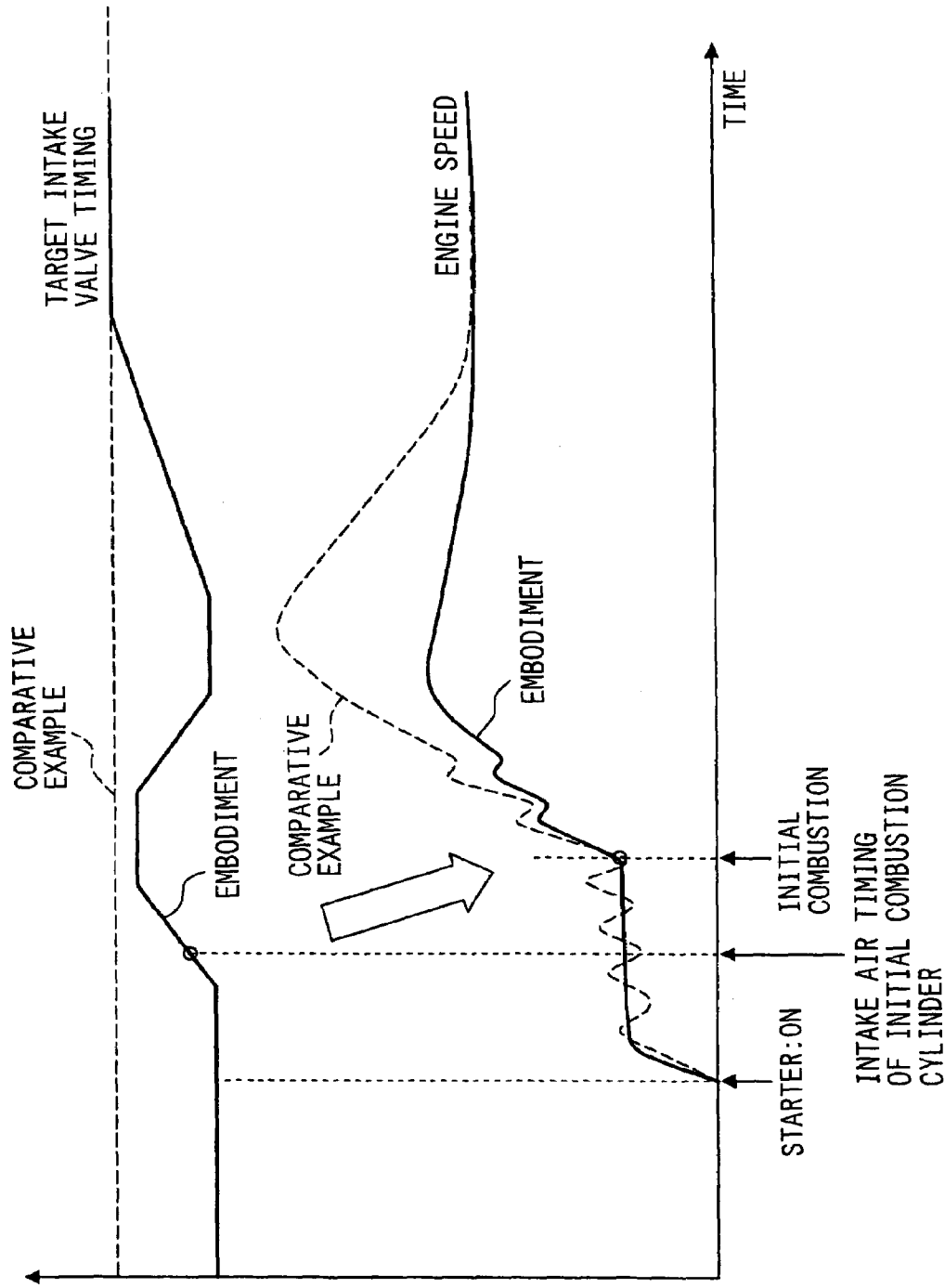
FIG. 4 is a time chart showing a process of variable intake valve control at starting engine according to the first embodiment.

As shown in a time chart of FIG. 4, the target intake valve timing at the intake timing of the initial combustion cylinder is a little advanced than the target valve timing before the cranking of the engine, so that the target intake valve timing corresponds to the target intake air flow rate in which the increment of the engine speed due to the initial combustion is restricted within the range where the startability is not deteriorated. The target intake valve timing at the intake timing of the other cylinder is advanced and then retarded, so that the target intake valve timing corresponding to the target intake air flow rate in which the increment of the engine speed after the initial combustion is also restricted within the range where the startability is not deteriorated.

Since the behavior of the engine speed varies according to temperature condition (engine oil temperature, engine coolant temperature, intake air temperature) of the engine 11, the target intake valve timing may be corrected based on the temperature condition of the engine 11.

Then, the procedure proceeds to step 110 in which the current actual intake valve timing is read. In step 111, a determination is made whether a phase difference exists between the actual intake valve timing and the target intake valve timing. When the answer is Yes in step 111, the procedure proceeds to step 112 in which the variable intake valve timing controller 30 makes the actual intake valve timing consistent with the target intake valve timing.

(The Variable Intake Valve Control at the Time of Failure of Engine Starting)

The variable intake valve control program for failure of engine starting shown in FIG. 3 is executed every predetermined period while the ECU 28 is energized. In step 201, a determination is made as to whether the starter is turned on. When the answer is Yes in step 201, the computer determines that the engine is cranking to advance the procedure to step 202. In step 202, the timer is started to measure the elapsed time period since the starter is turned on. Then, the procedure proceeds to step 203 in which the current engine speed NE is read.

In step 204, a determination is made as to whether the engine speed is increased to a predetermined value at the time when the predetermined time period elapsed since the starter is turned on. When the answer is Yes in step 204, the computer determines the engine starting is completed to end the procedure.

When the answer is No in step 204, the computer determines the failure of engine starting exists. The procedure proceeds to step 205 in which the target intake valve timing for failure of engine starting is read. This intake valve timing for the failure of the engine starting is a little advanced than the normal target intake valve timing in order to improve the startability.

Then, the procedure proceeds to step 206 in which the variable valve timing controller 30 make the actual intake valve timing consistent with the target intake valve timing for the failure.

According to the first embodiment, the startability is kept high as the same as a comparative example shown by doted line in FIG. 4, and the increment of the engine speed due to the initial combustion is restricted to reduce the emission and the vibration of the vehicle at the time of starting engine.

Alternatively, the behavior of the engine speed at the time of starting engine cranking may be estimated based on the behavior of the engine speed at cranking and the temperature condition of the engine 11. The target intake valve timing may be determined based on the estimated pattern of the engine speed behavior. Thereby, the intake air flow rate is accurately controlled without respect to a production disperse, an aging, and the starting condition.

Second Embodiment

Figure 5:
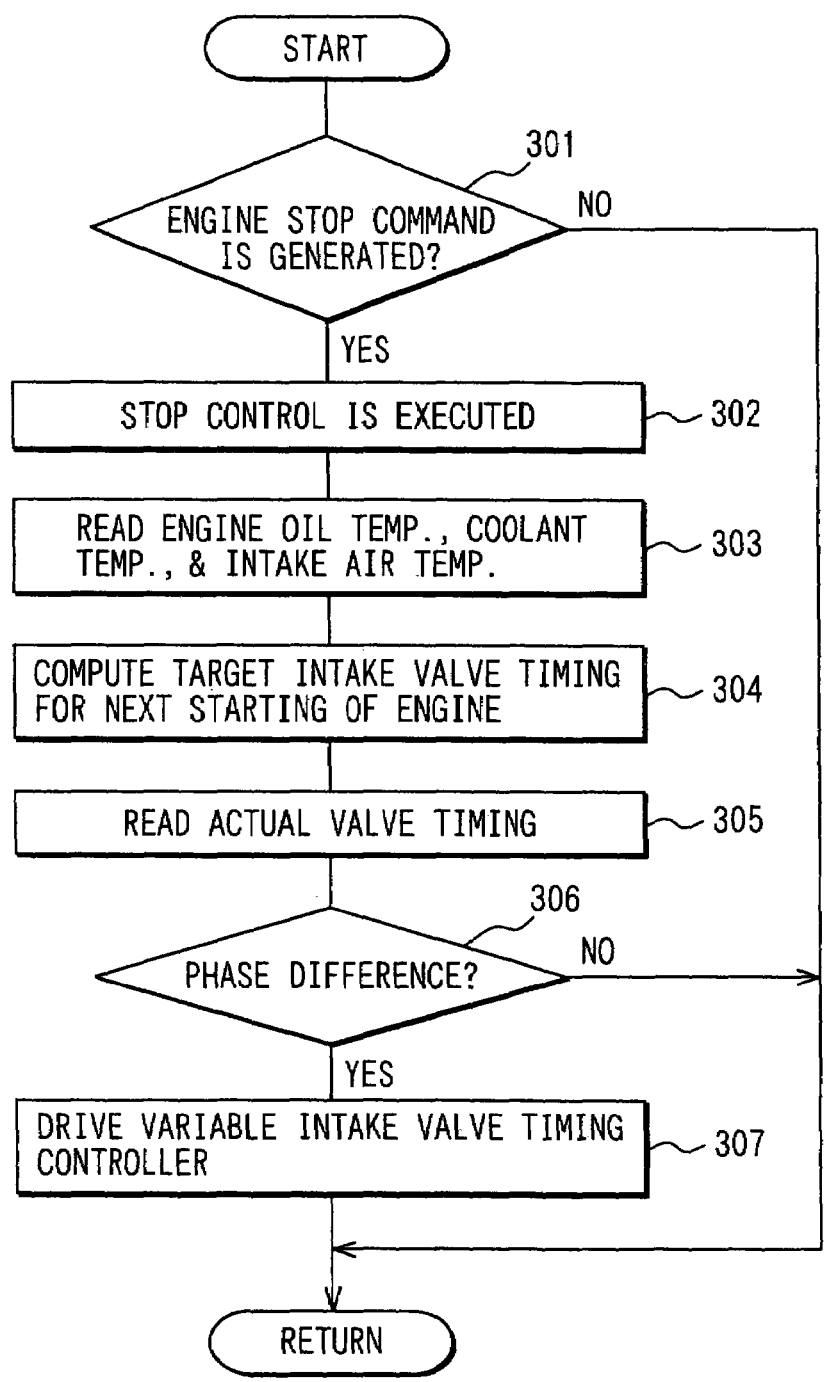
FIG. 5 is a flowchart showing a variable intake valve control at a time when an engine is stopped according to a second embodiment.
Figure 6:
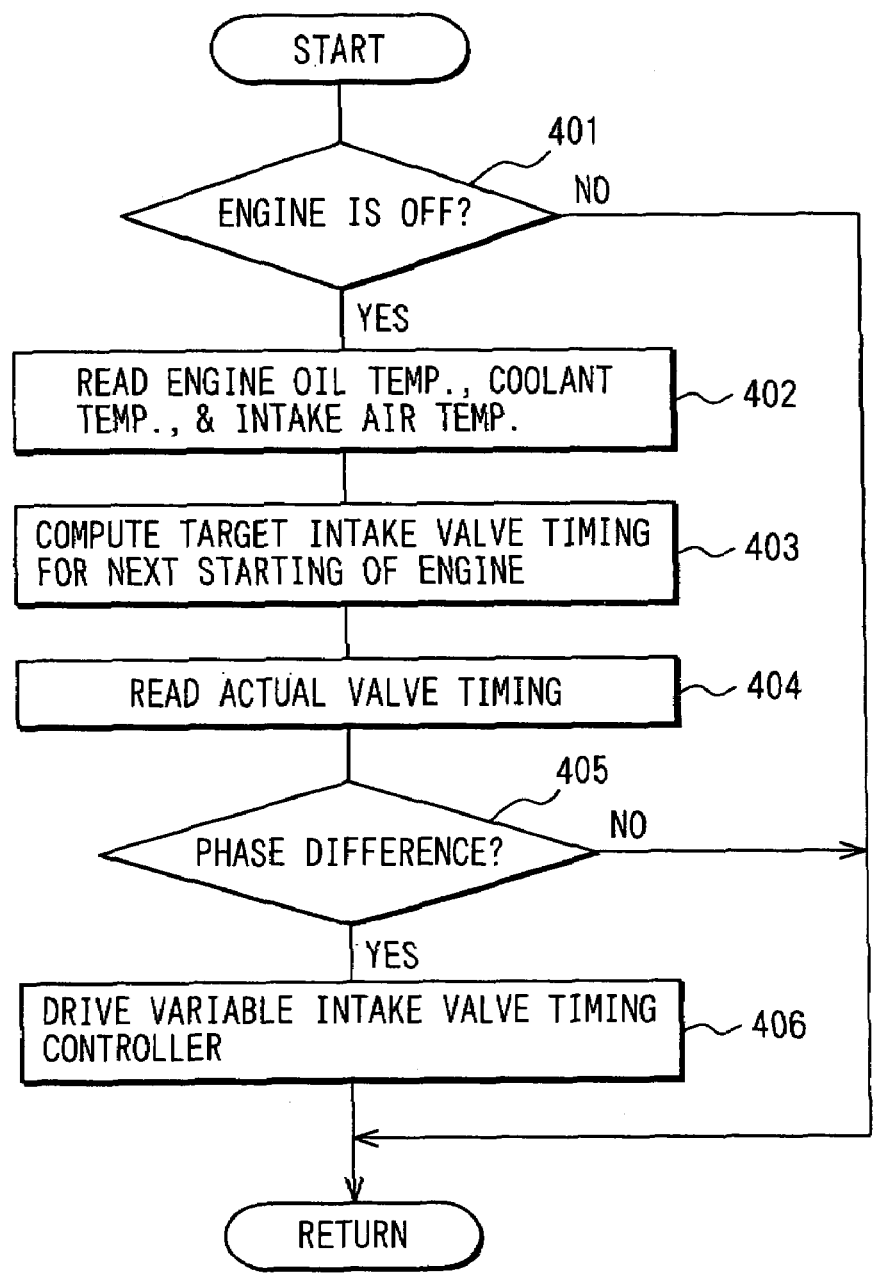
FIG. 6 is a flowchart showing a variable intake valve control during engine off according to the second embodiment.

Referring to FIGS. 5 and 6, a second embodiment is described hereinafter.

Due to a specification of a driving motor in the variable valve timing controller or a control position of the variable intake valve timing controller 30 at the time when the engine is stopped, there is a possibility that the actual valve timing cannot become the target intake valve timing corresponding to the target intake air flow rate of the initial combustion cylinder at the time of starting engine.

In the second embodiment, the ECU 28 controls the variable intake valve timing controller 30 in such a manner that the actual intake valve timing is consistent with the target intake valve timing by executing a program shown in FIG. 5 at the time when the engine is stopped, in which the target intake valve timing for next engine starting is established. Furthermore, by executing a program shown in FIG. 6, while the engine 11 is off, the target intake valve timing for the next engine starting is established. In the case that the programs shown in FIGS. 5 and 6 are executed, the ECU 28 is energized even after the ignition switch is turned off.

(Variable Intake Valve Control at the Time of Engine Stopping)

The variable intake valve control program shown in FIG. 5 is executed every predetermined period while the ECU 28 is on. In step 301, a determination is made as to whether an engine stop command is generated. When the engine stop command is generated, the procedure proceeds to step 302 in which each stop control (fuel injection stop control, ignition stop control) is executed.

Then, the procedure proceeds to step 303 in which at least one of engine oil temperature, engine coolant temperature, intake air temperature, intake manifold temperature and a battery voltage is read. This information affects the next engine start.

In step 304, the target intake valve timing for next starting of engine is computed based on the map. This target intake valve timing is established in such a manner as to correspond to the target intake air flow rate of the initial combustion cylinder at the next engine start or the vicinity of the target intake air flow rate.

Then, the procedure proceeds to step 305 in which the current actual valve timing is read. In step 306, a determination is made as to whether a phase difference exists between the actual valve timing and the target intake valve timing for next engine start. When the answer is Yes in step 306, the procedure proceeds to step 307 in which the ECU 28 controls the variable intake valve timing controller in such a manner that the actual intake valve timing is consistent with the target intake valve timing for next engine start. Thereby, the actual valve timing is brought to be the target intake valve timing for next engine start at the time when the engine is stopped.

(Variable Intake Valve Control During Engine Off)

The variable intake valve control program shown in FIG. 6 is executed every predetermined period while the ECU 28 is on. In step 401, a determination is made as to whether the engine 11 is off based on whether the engine speed is zero. When the engine is off, the procedure proceeds to step 402 in which at least one of engine oil temperature, engine coolant temperature, intake air temperature, intake manifold temperature and a battery voltage is read.

In step 403, the target intake valve timing for next engine start is computed based on the map. This target intake valve timing is established in such a manner as to correspond to the target intake air flow rate of the initial combustion cylinder at the next engine start or the vicinity of the target intake air flow rate.

Then, the procedure proceeds to step 404 in which the current actual valve timing is read. In step 405, a determination is made as to whether a phase difference exists between the actual valve timing and the target intake valve timing for next engine start. When the answer is Yes in step 405, the procedure proceeds to step 406 in which the ECU 28 controls the variable intake valve timing controller 30 in such a manner that the actual intake valve timing is consistent with the target intake valve timing for next engine start. Thereby, the actual valve timing is brought to be the target intake valve timing for next engine start while the engine is off.

According to the second embodiment, the variable intake valve controls shown in FIGS. 5 and 6 are executed. However, only one of them can be executed.

The variable intake valve controller 30 can adjusts at least one of valve timing, valve lift, and valve opening period.

Third Embodiment

Figure 9:
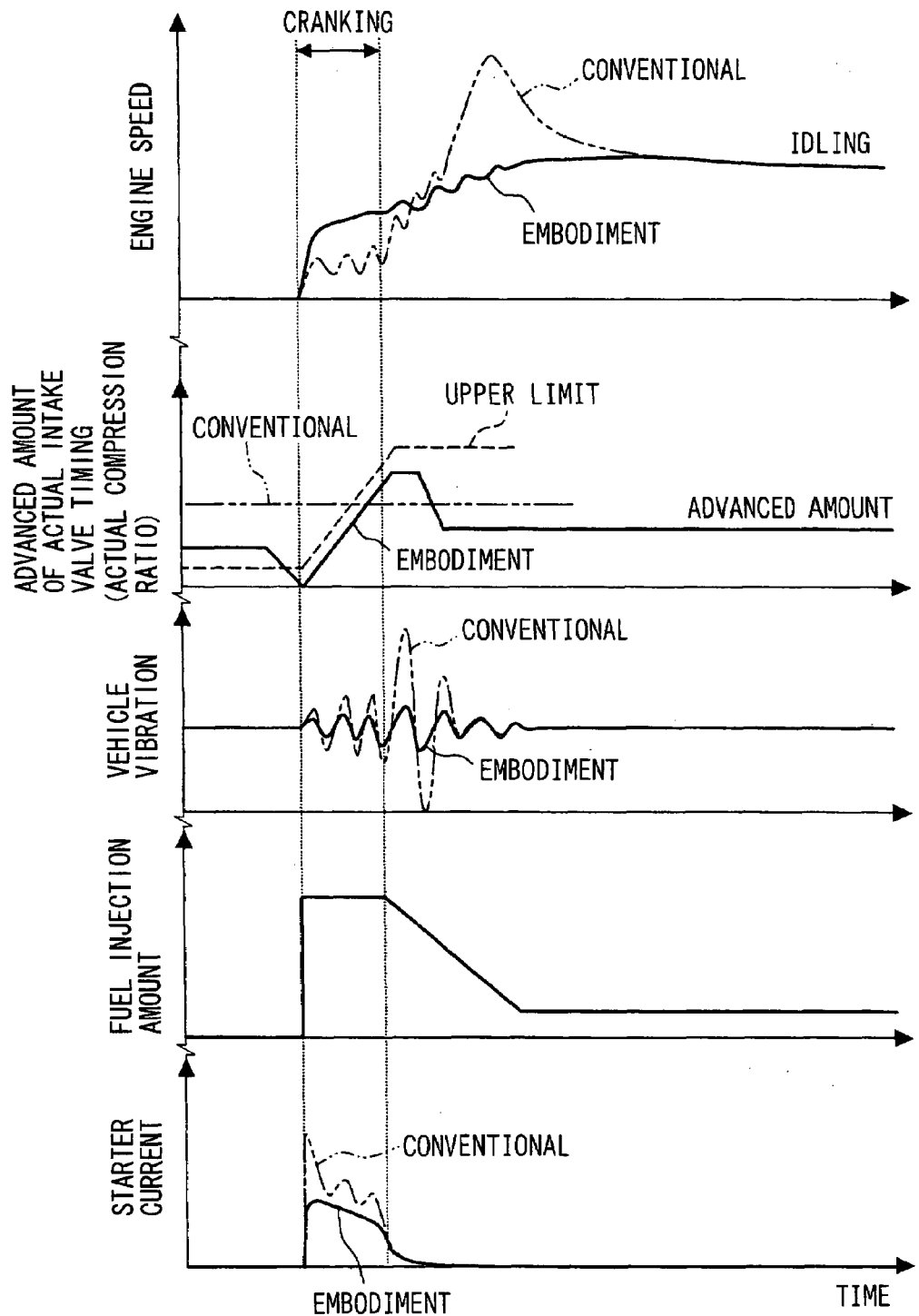
FIG. 9 is a time chart showing a starting process according to the third embodiment.

As shown in FIG. 9, the starter 33 starts cranking of the engine 11 in a situation that the variable intake valve timing controller 30 retards the actual intake valve timing so that the actual compression ratio is decreased to a level in which the vehicle vibration is reduced at cranking. At the time when the engine speed is increased by cranking so that the vehicle vibration is reduced to a predetermined level, the ignition is started. The actual intake valve timing is gradually advanced during cranking in such a manner as to gradually increase the actual compression ratio according to cranking duration (or engine speed). Thereby, the actual compression ratio is increased to a ratio in which the engine 11 is driven by the combustion pressure at the same time as the combustion start timing.

Figure 7:
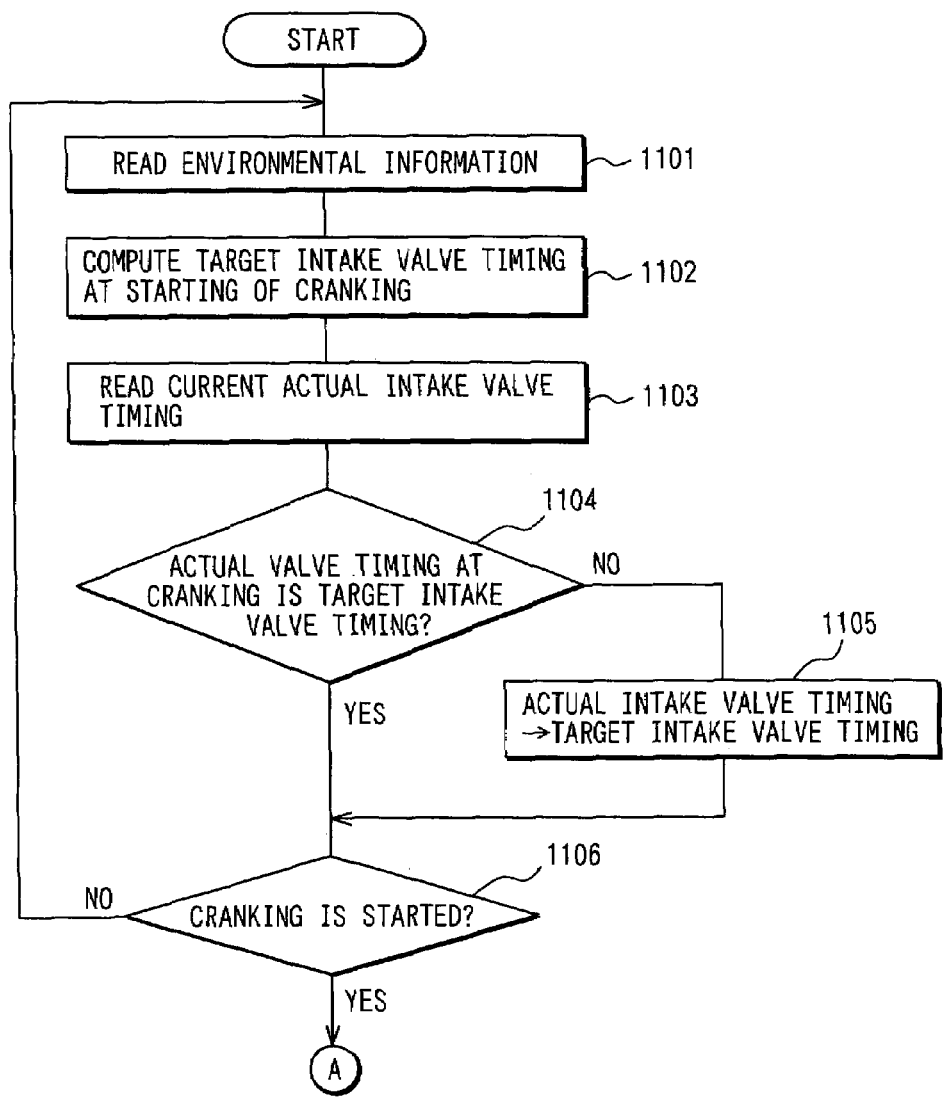
FIG. 7 is a flowchart showing a start control process according to a third embodiment.
Figure 8:
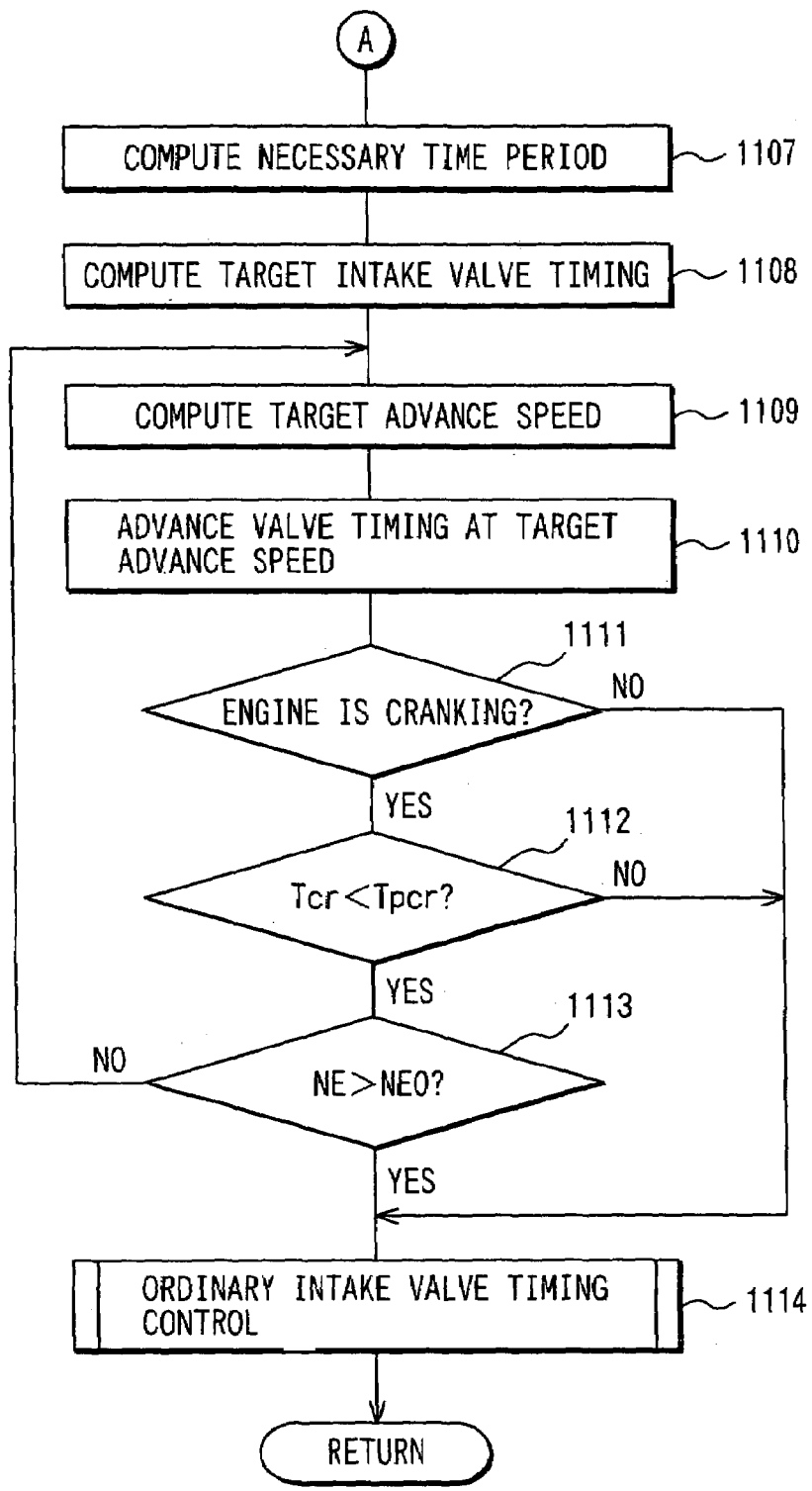
FIG. 8 is a flowchart showing a starting control process according to the third embodiment.

The processes of the start control program shown in FIGS. 7 and 8 are described hereinafter.

In step 1101, at least one of coolant temperature, engine oil temperature, intake air temperature, and atmospheric pressure is read. In step 1102, a target intake valve timing at starting of cranking is computed based on at least one of coolant temperature, engine oil temperature, intake air temperature, and atmospheric pressure.

A map of the target intake valve timing at starting of cranking is established based on environmental information, a relationship between the actual compression ratio and vibration, and a relationship between the actual compression ratio and the intake valve timing. The target intake valve timing corresponds to the actual compression ratio in which the vehicle vibration at cranking is reduced to a permissible level. The target intake valve timing at starting of cranking is retarded than the ordinary target intake valve timing (for example, ABDC 120° C.A).

In step 1103, the current actual intake valve timing is read. In step 1104, a determination is made as to whether the actual intake valve timing is consistent with the target intake valve timing at starting of cranking. When the answer is No in step 1104, the procedure proceeds to step 1105 in which the variable valve timing controller 30 is controlled in such a manner that the actual intake valve timing is consistent with the target intake valve timing at start of cranking. Thereby, just before starting of cranking, the actual intake valve timing is retarded to the target intake valve timing, so that the actual compression ratio is decreased in order to reduce the vehicle vibration at cranking.

Then, the procedure proceeds to step 1106 in which a determination is made as to whether the cranking is started. When the answer is No in step 1106, the procedure goes back to the step 1101.

When the answer is Yes in step 1106, the procedure proceeds to step 1107 of FIG. 8. In step 1107, a necessary time period for reaching the intake timing is computed based on the map according to the environmental information.

Then the procedure proceeds to step 1108 in which the target intake valve timing is computed based on the map according to the environmental information, such as the coolant temperature, the engine oil temperature, the intake air temperature, and the atmospheric pressure.

The map of the target intake valve timing is established based on the environmental condition based on the experimental data and the design data, a relationship between the actual compression ratio and the vehicle vibration, and a relationship between the actual compression ratio and intake valve timing. The target intake valve timing corresponds to the actual compression ratio in which the engine is driven by the combustion pressure reducing the vehicle vibration at the initial combustion to the permissible level.

Then, the procedure proceeds to step 1109, in which a target advance speed during cranking is computed based on the current actual intake valve timing, the target intake valve timing, and the necessary time period for reaching the intake timing. The target advance speed is established in such a manner that the actual intake valve timing is advanced to the target intake valve timing at the time when the necessary period has passed.

In step 1110, the variable valve timing controller 30 advances the intake valve timing at the target advance speed. At the time when the necessary time period for reaching the intake timing has passed, the actual intake valve timing is advanced to the target intake valve timing. As shown in FIG. 9, the actual intake valve timing is gradually advanced in such a manner not to exceed an upper limit of the intake valve timing in which the vehicle vibration is under the permissible level, so that the actual compression ratio is gradually increased in such a manner not to exceed the upper limit of the actual compression ratio. The actual intake valve timing may be gradually advanced according to the engine speed in order to gradually increase the actual compression ratio.

Then, the procedure proceeds to step 1111 in which a determination is made as to whether the engine is cranking. When the answer is Yes in step 1111, the procedure proceeds to step 1112 in which a determination is made as to whether a cranking duration Tcr is less than a predetermined time period Tpcr. This time period Tpcr corresponds to a guard value for preventing the cranking period from being continued too long. In the case that the cranking is normal, the engine speed can exceed a predetermined speed in the time period Tpcr.

When the answer is Yes in step 1112, the procedure proceeds to step 1113 in which a determination is made as to whether the engine speed NE exceeds the predetermined speed NEO which is established around a resonance speed between the engine 11 and the vehicle (for example, 400 rpm). When the answer is No in step 1113, the procedure goes back to step 1109.

When the engine speed NE exceeds the speed NEO, it is determined that the engine 11 reaches a combustion start cycle. At this time, the actual intake valve timing is advanced to the target intake valve timing for combustion start cycle, and the actual compression ration reaches a level in which the engine is driven by the combustion pressure, so that the spark plug starts to ignite the air-fuel mixture in the cylinder.

Then, the procedure proceeds to step 1114 in which an ordinary intake valve timing control is conducted so that the target intake valve timing is established based on the engine driving condition and the variable intake valve timing controller 30 makes the actual intake valve timing consistent with the target intake valve timing.

When the answer is No in step 1111 or step 1112, the procedure proceeds to step 1114 in which the ordinary intake valve timing control is conducted.

In the conventional starting control which is shown by chain double-dashed lines in FIG. 9, the combustion (ignition) is started during cranking of the engine, so that the actual compression ratio is kept to a level in which the combustion pressure is generated enough to drive the engine 11. Thus, when the starter cranks the engine 11, the fluctuation in cylinder pressure increases to generate the vehicle vibration. Furthermore, while the starter cranks the engine and the engine speed is increased by the combustion pressure, vibrations are generated due to variation in speed every combustion in each cylinder and a large vibration is generated in the resonance region between the engine and the vehicle.

On the other hand, in the present embodiment shown by solid lines in FIG. 9, the starter 33 starts the cranking of the engine 11 in the situation that the actual intake valve timing is retarded in such a manner that the actual pressure ratio is decreased to a level in which the vehicle vibration is reduced. When the engine speed reaches the predetermined speed in which the vehicle vibration at the time of initial combustion is reduced, the combustion (ignition) of the engine 11 is started. Furthermore, the actual valve timing is gradually advanced in such a manner that the actual compression ratio is gradually increased according to the cranking duration during cranking of the engine, so that the actual compression ratio is increased to drive the engine 11 by the combustion pressure in accordance with the combustion start timing.

Thereby, the cranking by the starter 33 is conducted in the situation that the actual compression ration is increased by the intake valve timing control, so that the fluctuation in cylinder pressure is decreased and the cranking torque is decreased to rapidly increase the engine speed by the starter 33. Thus, The vehicle vibration due to a resonance vibration is reduced and the starting period of the engine 11 is increased. Furthermore, it is unnecessary to crank the engine up to the idle speed by the starter 33. Thus, the starter 33 can be utilized and no special motor for cranking is necessary.

In the present embodiment, the actual intake valve timing is retarded in such a manner that the actual compression ratio is decreased to a level in which the vehicle vibration generated at cranking is reduced. Alternatively, the actual intake valve timing may be retarded while the engine is in a shutdown period or the engine is off.

According to the present embodiment, since the actual compression ratio is varied according to the environmental condition, the actual compression ratio is appropriately adjusted without respect to a change of the environmental condition.

Since the actual compression ratio is reduced at the time of cranking by the starter 33, the initial torque for cranking is reduced. Thus, the starter 33 may be a low-torque-type starter.

The high-speed and low-torque-type starter 33 can increase the engine speed to a predetermined speed. The high-speed and low-torque-type starter 33 is constructed by a minor change of the ordinary starter to reduce the production cost thereof.

According to the present embodiment, the actual compression ratio can be increased according as the engine speed during cranking is increased and an upper limit of the actual compression ratio is increased. Thus, the actual compression ratio is brought to be the target value without respect to a response delay of the variable intake valve timing controller. Generally, according as the engine speed increases, the cranking torque is decreased. Even if the actual compression ratio is increased according as the engine sped is increased during cranking, the engine speed is hardly affected to rapidly pass through the resonance vibration speed region.

The actual compression ratio may be gradually increased by gradually advancing the actual intake valve timing based on the map according to the engine speed at cranking and cranking duration.

The relationship between the cranking duration and the increment of the engine speed is established in advance, and the time of the combustion start cycle can be determined based on the engine speed estimated based on the cranking duration.

According to the present embodiment, when the engine speed exceeds the resonance vibration speed (for example, 400 rpm), the combustion is started. Alternatively, the combustion can be started when the engine speed exceeds a predetermined speed (for example, 300 rpm) in which the vehicle vibration is restricted under a predetermined level.

The present invention can be applied to not only a vehicle driven by an engine but also a hybrid vehicle driven by an engine and a motor.

What is claimed is:

1. A start controller for an internal combustion engine, including a starter which cranks a crank shaft of the engine at a time of starting engine and a variable intake valve controller which adjusts the intake valve characteristic, the start controller comprising:
   a start control means for starting a cranking of the engine by means of the starter in a situation that an actual compression ratio is decreased by the variable intake valve controller,
   the start control means starting combustion of the engine at a time when an engine speed is increased to restrict a vehicle vibration due to an initial combustion under a predetermined level, and
   the start control means increasing the actual compression ratio by means of the variable intake valve controller at a time when or before the combustion is started;
   wherein an engine speed in which the vehicle vibration due to the initial combustion is restricted to the predetermined level corresponds to an engine speed in which the vehicle vibration is restricted under the predetermined level even at an engine speed which exceeds a resonance vibration speed range between the engine and the vehicle.

2. The start controller according to claim 1, wherein the start control means establishes the actual compression ratio at cranking in such a manner that the vehicle vibration at cranking is restricted under a predetermined level, and establishes the actual compression ratio at combustion start cycle in such a manner that a combustion pressure drives the engine.

3. The start controller according to claim 1, wherein the start control means controls the variable intake valve timing controller in such a manner that the actual compression ratio is gradually increased according to a speed of the engine and/or a cranking duration during cranking of the engine.

4. The start controller according to claim 1, wherein the starter is a high-speed-type starter.

5. The start controller according to claim 1, wherein the start control means controls the variable intake valve controller in such a manner that the actual compression ratio is varied according to an environmental condition.

6. A start controller for an internal combustion engine, including a starter which cranks a crank shaft of the engine at a time of starting engine and a variable intake valve controller which adjusts the intake valve characteristic, the start controller comprising:
   a start control means for starting a cranking of the engine by means of the starter in a situation that an actual compression ratio is decreased by the variable intake valve controller,
   the start control means starting combustion of the engine at a time when an engine speed is increased to restrict a vehicle vibration due to an initial combustion under a predetermined level, and
   the start control means increasing the actual compression ratio by means of the variable intake valve controller at a time when or before the combustion is started;

wherein the start control means measures an engine speed or a cranking duration during cranking of the engine, and the start control means determines, based on the measured value, whether the engine speed is increased to a speed in which the vehicle vibration due to the initial combustion is restricted under the predetermined level.

7. The start controller according to claim 6, wherein the start control means establishes the actual compression ratio at cranking in such a manner that the vehicle vibration at cranking is restricted under a predetermined level, and establishes the actual compression ratio at combustion start cycle in such a manner that a combustion pressure drives the engine.

8. The start controller according to claim 6, wherein the start control means controls the variable intake valve controller in such a manner that the actual compression ratio is varied according to an environmental condition.

9. The start controller according to claim 6, wherein the start control means controls the variable intake valve timing controller in such a manner that the actual compression ratio is gradually increased according to a speed of the engine and/or a cranking duration during cranking of the engine.

10. The start controller according to claim 6, wherein the starter is a high-speed-type starter.

* * * * *